United States Patent
Fujimoto et al.

(10) Patent No.: US 6,781,649 B2
(45) Date of Patent: Aug. 24, 2004

(54) COLOR FILTER FOR LIQUID CRYSTAL DISPLAY AND INK JET METHOD FOR MANUFACTURING THE SAME

(75) Inventors: Hisayoshi Fujimoto, Kyoto (JP); Hiroaki Onishi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/167,999

(22) Filed: Jun. 11, 2002

(65) Prior Publication Data

US 2003/0007110 A1 Jan. 9, 2003

(30) Foreign Application Priority Data

Jun. 12, 2001 (JP) ........................................ 2001-177272

(51) Int. Cl.⁷ ........................... G02F 1/1335; B41J 2/01
(52) U.S. Cl. ........................................ 349/106; 347/107
(58) Field of Search ........................... 349/106; 347/107

(56) References Cited

U.S. PATENT DOCUMENTS 5,948,577 A * 9/1999 Nakazawa et al. ............. 430/7
6,177,214 B1 * 1/2001 Yokoyama et al. ............. 430/7
6,224,205 B1 * 5/2001 Akahira et al. ............. 347/107
6,535,188 B1 * 3/2003 Morimoto ..................... 345/87

FOREIGN PATENT DOCUMENTS

JP          06-95100       4/1994
JP       2001100022   *   4/2001  ............ G02B/5/20

* cited by examiner

*Primary Examiner*—Robert H. Kim
*Assistant Examiner*—Jeanne Andrea Di Grazio
(74) *Attorney, Agent, or Firm*—Merchant & Gould P.C.

(57) ABSTRACT

A liquid crystal display device includes a first substrate (1) and a second substrate (2) disposed in parallel to each other, a liquid crystal layer (3) disposed between the two substrates (1, 2) and filled with liquid crystal, and an ink retaining layer (7) disposed on a surface (1b) of the first substrate (1) facing the second substrate (2). A surface of the ink retaining layer (7) is provided with plural filter strips (7R, 7G, 7B) each retaining a respective color ink, and each of the filter strips (7R, 7G, 7B) includes plural columns and plural rows of generally circular dots (24) arranged in a strip or rectangle, each of them being provided by a color ink droplet.

10 Claims, 8 Drawing Sheets

COLOR FILTER FOR LIQUID CRYSTAL DISPLAY AND INK JET METHOD FOR MANUFACTURING THE SAME

FIELD OF THE INVENTION

This invention relates to a liquid crystal display device and a process for making the same.

BACKGROUND OF THE INVENTION

FIG. 9 shows an example of conventional liquid crystal display devices. This liquid crystal display device includes a first and a second substrates 41, 42. The first and the second substrates 41, 42 are disposed in parallel to each other.

The first substrate 41 includes an upper surface 41a provided with a polarizer plate 45 and a retardation plate 46. The polarizer plate 45 allows penetration of light rays that vibrate only in a specific direction. The polarizer plate 45 restricts entry of the light rays from the outside to the first substrate 41 or exit of the light rays from the first substrate 41. The retardation plate 46 is disposed between the first substrate 41 and the polarizer plate 45. The retardation plate 46 compensates for interference colors caused by birefringence at the liquid crystal. The retardation plate 46 enhances the viewing angle.

The first substrate 41 includes a lower surface 41b provided with a color filter layer 47. The color filter layer 47 may comprise a water absorptive resin, for example. The color filter layer 47 includes filter strips 47R, 47G, 47B. The filter strips 47R, 47G, 47B are colored red, green and blue, respectively. The filter strips 47R, 47G, 47B are arranged in parallel to each other in a widthwise direction.

The color filter layer 47 has a lower surface provided with a plurality of transparent electrodes 51 in the form of strips. The transparent electrodes 51 are arranged in corresponding relationship with filter strips 47R, 47G, 47B. The second substrate 42 has an upper surface 42a provided with a plurality of reflective electrodes 53 in the form of strips which extend perpendicularly to the transparent electrodes 51.

A liquid crystal layer 43 filled with liquid crystal is disposed between the first and the second substrates 41, 42. The liquid crystal layer 43 is surrounded by a seal member 55. Pixels are provided at the intersections between the transparent electrodes 51 and the reflective electrodes 53 in the liquid crystal layer 43. The pixels of the liquid crystal layer 43 are arranged in a matrix. A surface of the transparent electrodes 51 and a surface of the reflective electrodes 53 are covered, respectively, with an alignment films 54A, 54B. These alignment films 54A, 54B determine the twist of liquid crystal (liquid crystal molecules).

Light rays from the outside enter the above-described liquid crystal display device and travel through the polarizer plate 45, the retardation plate 46, the first substrate 41, the color filter layer 47, the transparent electrodes 51 and the liquid crystal layer 43. After travelling through the liquid crystal layer 43, the light rays are reflected upwardly by the reflective electrodes 53. The light rays reflected upwardly, then, travel back through the same path to be emitted to the front side of the liquid crystal display device.

The filter strips 47R, 47G, 47B of the color filter layer 47 provides corresponding colored regions 48R, 48G, 48B on the surface of the color filter layer 47, as shown in the FIG. 10. The colored regions 48R, 48G, 48B are strips provided in parallel to each other in a widthwise direction. Each of the filter strips 47R, 47G, 47B is provided when a color ink is supplied to the water absorptive resin of the color filter layer 47 by the ink-jet method, for example.

In the ink-jet method, an ink-jet printhead 57 is first arranged on a surface of the water absorptive resin applied on the surface 41b of the first substrate 41, as shown in the FIG. 11. Then, nozzles 57R, 57G, 57B of the ink-jet printhead 57 jet red, green or blue inks, respectively. In this way, the water absorptive resin is impregnated with the color ink. Each of generally circular dots 58 is provided by a color ink droplet on a surface of the color filter layer 47, as shown in the FIG. 12.

The ink-jet printhead 57, then, translates to the next row as viewed perpendicularly to the paper plain of the FIG. 12, and jets an ink. Thereby, a plurality of dots 58 are arranged partially overlapping with each other, providing the colored regions 48R, 48G, 48B. The diameter of the dots 58 may be approximately 90 $\mu$m.

The size of the dots 58 may vary due to the state or the amount of the color ink jetted. When the diameter of the dots 58 varies by 10%, irregularities in the dot diameter will be in a range of approximately 81–99 $\mu$m. As a result, when two dots between adjacent colored regions 48R, 48G, 48B are both diametrically smallest, the size of the clearance therebetween (indicated as A in the FIG. 12) is as large as about 9 $\mu$m at the maximum.

When the dots have such diametrical irregularities in the colored regions 48R, 48G, 48B, clearances at boundaries of adjacent colored regions 48R, 48G, 48B may become relatively large. The boundaries between the adjacent colored regions 48R, 48G, 48B undulate due to the clearances. Therefore, in the liquid crystal display device incorporating the color filter layer 47 having such clearances and undulations, the filter strips 47R, 47G, 47B may not suitably mix different colors, thereby failing to provide proper color representation. The clearances and the undulations also deteriorate the image quality.

In order to eliminate the clearances and the undulations described above, a black matrix that intercepts light may be provided at the boundaries of the filter strips 47R, 47G, 47B. However, formation of a black matrix may require photolithography, the manufacturing process may become complex, consequently resulting in an increase of production time and cost. Other methods may include providing a barrier wall or water repellent treatment at the boundaries of the filter strips 47R, 47G, 47B on a surface of the water absorptive resin 56 for preventing color ink deposition. However, these methods also require time and increase the cost.

DISCLOSURE OF THE INVENTION

It is therefore an object of the present invention to provide a liquid crystal display device which is capable of eliminating or at least reducing the problems described above.

In accordance with a first aspect of the present invention, there is provided a liquid crystal display device comprising: a first and a second substrates disposed in parallel to each other; a liquid crystal layer disposed between the two substrates and filled with liquid crystal; and a color filter layer disposed on a surface of the first substrate facing the second substrate;

wherein a surface of the color filter layer is provided with plural filter strips each retaining a respective color ink; and wherein each of the filter strips includes plural columns of and plural rows of generally circular dots arranged in a strip or rectangle, each of the dots being provided by a color ink droplet.

Preferably, the color filter layer may comprise a water absorptive resin.

Preferably, each of the filter strips may be provided by impregnating the water absorptive resin with a respective color ink.

Preferably, each of the dots may be 20–40 $\mu$m in diameter.

Preferably, adjacent ones of the dots may partially overlap each other.

Preferably, the color inks may include red, green and blue inks.

Preferably, the liquid crystal in the liquid crystal layer may be controlled by voltage application in a normally black mode.

In accordance with a second aspect of the present invention, there is provided a process for making a liquid crystal display device which comprises: a first and a second substrates disposed in parallel to each other; a liquid crystal layer disposed between the two substrates and filled with liquid crystal; and a color filter layer disposed on a surface of the first substrate facing the second substrate; the process comprising the steps of:

applying a water absorptive resin onto the surface of the first substrate facing the second substrate to form an ink retaining layer that serves as the color filter layer; and jetting different color inks onto the ink retaining layer to form filter strips at each of which the water absorption resin is impregnated with a respective color ink;

wherein the step of providing the filter strips is performed in a manner such that each of the filter strips includes plural columns of and plural rows of generally circular dots arranged in a strip or rectangle, each of the dots being provided by a color ink droplet.

Preferably, the step of forming the filter strips may include jetting different color inks onto the ink retaining layer by an ink-jet method.

Preferably, the water absorptive resin may comprise polyvinyl alcohol.

The other features and advantages of the present invention will be clarified in the detailed description given below with reference to the accompanying drawings.

BEST MODE FOR CARRYING OUT THE INVENTION

Figure 1:
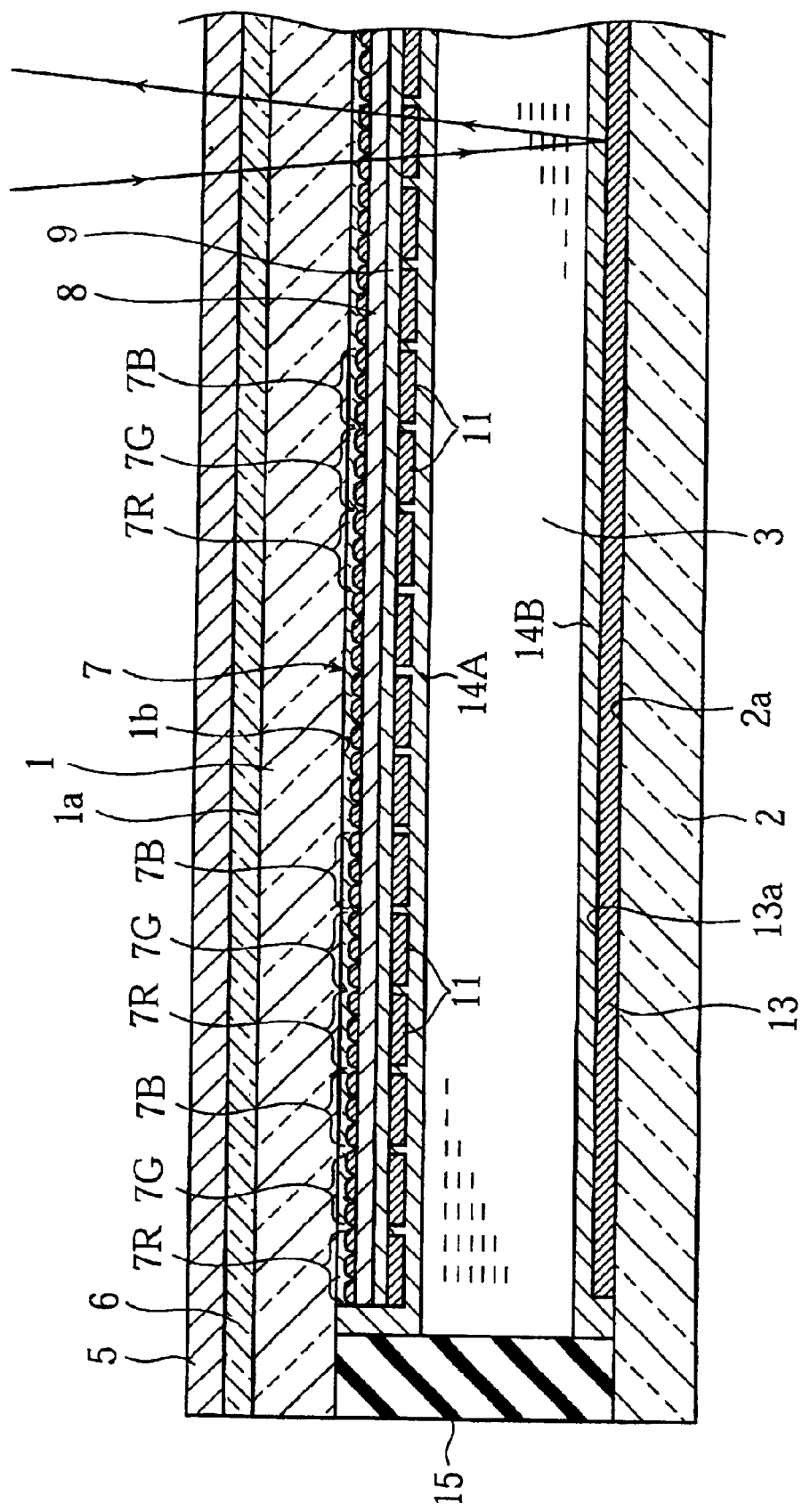
FIG. 1 is a sectional view showing a principal portion of a liquid crystal display device in accordance with the present invention.

Preferred embodiments of the present invention will be described below in detail with reference to the accompanying drawings.

First, reference is made to FIGS. 1–4. These figures illustrate a liquid crystal display device in accordance with an embodiment of the present invention. This liquid crystal display device is a reflective display device capable of providing color representations. The liquid crystal display device includes a first and a second substrates 1, 2 disposed in parallel to each other, and a liquid crystal layer 3 filled with liquid crystal. The first and the second substrates 1, 2 may be made of glass or plastic, for example. The liquid crystal layer 3 is provided between the first and the second substrates 1, 2.

The first substrate 1 includes a surface 1b that faces the second substrate 2, and an opposite surface 1a on which a polarizer plate 5 and a retardation plate 6 are disposed. The polarizer plate 5 and the retardation plate 6 are laminated. The polarizer plate 5 allows penetration of light rays that vibrate only in a specific direction. The polarizer plate 5 restricts entry of light from the outside to the first substrate 1 or exit of light from the first substrate 1. The polarizer plate 5 includes a polarizer film and protective films sandwiching it. The polarizer plate 5 may comprise a polyvinyl alcohol film stretched in one direction and impregnated with iodine.

The retardation plate 6 lies between the polarizer plate 5 and the first substrate 1. The retardation plate 6 compensates for interference colors caused by birefringence at the liquid crystal. The retardation plate 6 enhances the viewing angle. The retardation plate 6 may comprise a film of a polymer such as polycarbonate laminated on the polarizer plate 5 with the use of an adhesive.

The surface 1b of the first substrate 1 facing the second substrate 2 is provided with an ink retaining layer 7 that serves as a color filter layer. The ink retaining layer 7 may be made of a water absorptive resin, for example. The ink retaining layer 7 includes filter strips 7R, 7G, 7B which are colored red, green and blue, respectively. Details of the ink retaining layer 7 will be described later.

A surface of the ink retaining layer 7 is formed with a smoothing layer 8 and a bond-enhancing layer 9. The smoothing layer 8 protects the surface of the ink retaining layer 7. The smoothing layer 8 also smoothes the surface of the ink retaining layer 7. The smoothing layer 8 may be made of e.g. an acrylic resin applied by the spin-coat method and then cured. The resin application for forming the smoothing layer 8 may be performed by screen printing or by any other method.

The bond-enhancing layer 9 is provided for strongly bonding the transparent electrodes 11, which will be described hereinafter, to the smoothing layer 8. The bond-enhancing layer 9 may be made of $SiO_2$, for example. The bond-enhancing layer 9 comprises a thin film formed by vapor deposition or sputtering.

A surface of the bond-enhancing layer 9 is provided with a plurality of transparent electrodes 11. The transparent electrodes 11 are arranged in corresponding relationship with the filter strips 7R, 7G, 7B of the ink retaining layer 7. The transparent electrodes 11 are, as shown in the FIG. 2, in the form of strips. The transparent electrodes 11 are arranged in parallel to each other with a suitable widthwise spacing therebetween. The transparent electrodes 11 are slightly smaller in width than the filter strips 7R, 7G, 7B. The transparent electrodes 11 may be made by first performing e.g. sputtering to form an indium oxide (ITO) film doped with a small amount of e.g. Sn, and then etching the film.

Figure 2:
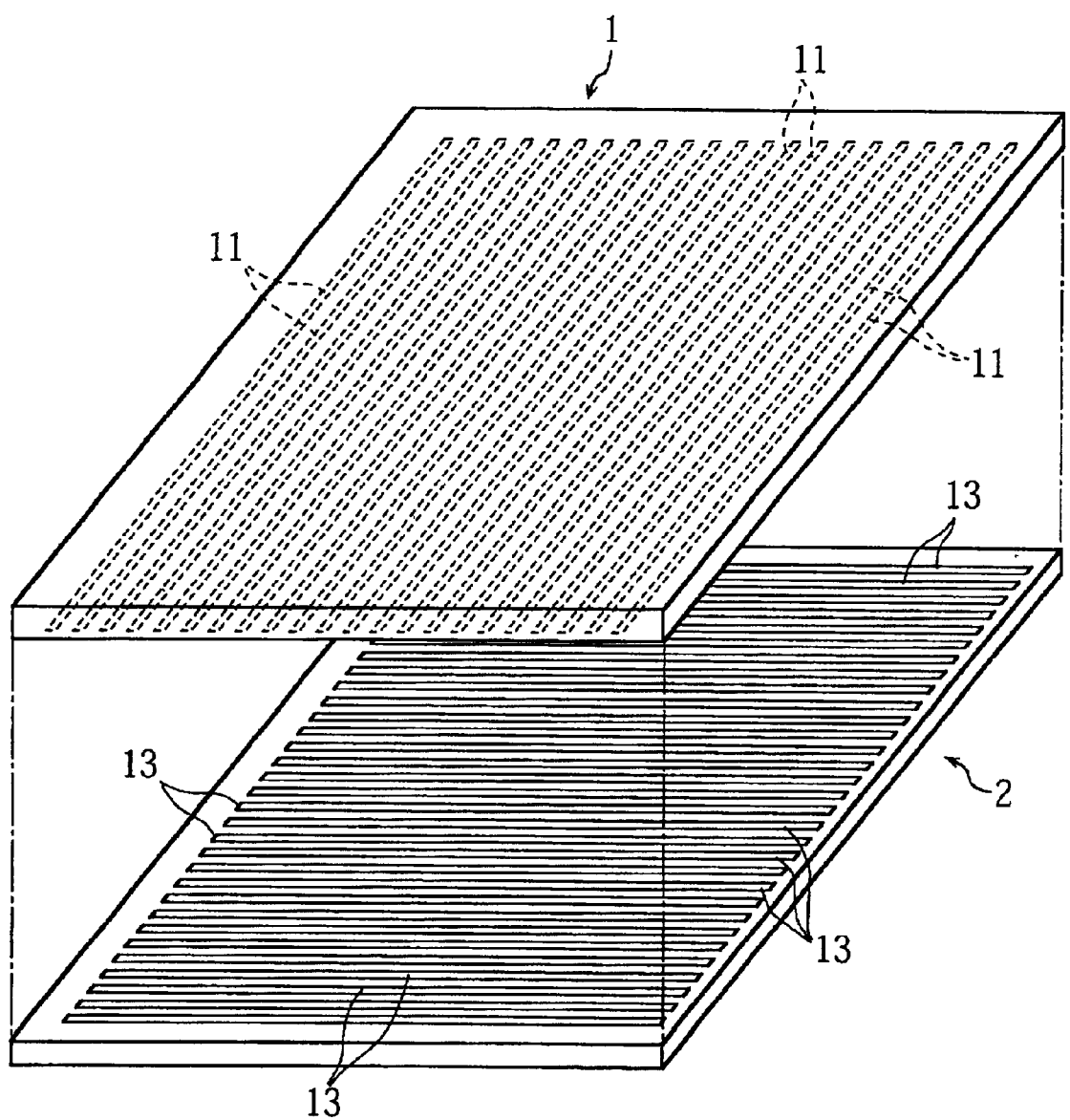
FIG. 2 is a perspective view showing a first and a second substrates of the liquid crystal display device shown in the FIG. 1.
Figure 3:
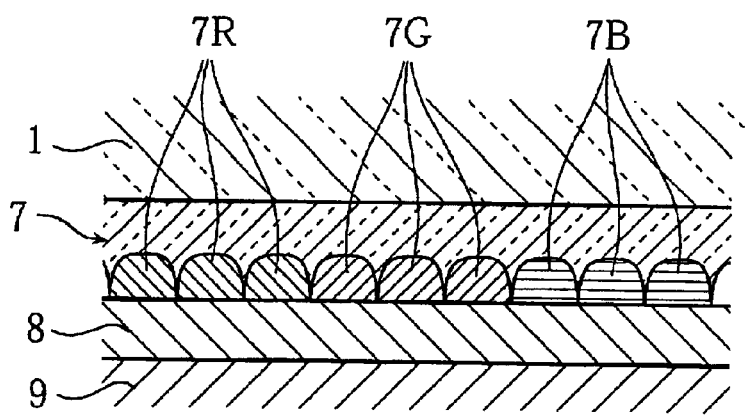
FIG. 3 is an enlarged fragmentary sectional view showing an ink retaining layer disposed in the liquid crystal display device shown in the FIG. 1.

A surface 2a of the second substrate 2 facing the first substrate 1 is provided with a plurality of reflective electrodes 13. The reflective electrodes 13 are, as shown in FIG. 2, in the form of strips just like the transparent electrodes 11. The reflective electrodes 13 extend perpendicularly to the transparent electrodes 11. The reflective electrodes 13 may be made by first forming an Al film or the like through sputtering, and then etching the film.

A plurality of pixels are provided at the intersections between the transparent electrodes 11 and the reflective electrodes 13 in the structure mentioned above. The pixels include red display regions, green display regions and blue display regions. Each pixel is selectively activated when a voltage is impressed across a corresponding transparent electrode 11 and a corresponding reflective electrode 13 to place the liquid crystal molecules under the influence of the voltage.

The transparent electrodes 11 are covered with an alignment film 14A. The reflective electrodes 13 are covered with an alignment film 14B. These alignment films 14A, 14B are provided in order to twist liquid crystal molecules. The alignment films 14A, 14B are formed by first applying a polymide resin or the like on the surfaces of the transparent electrodes 11 and the reflective electrodes 13, drying it, and then rubbing the surfaces.

A liquid crystal layer 3 is provided between the alignment films 14A, 14B. The liquid crystal layer 3 may be filled with an STN liquid crystal, for example. The liquid crystal layer 3 is surrounded by a seal member 15. These alignment films 14A, 14B twist the liquid crystal molecules contained in the liquid crystal layer 3.

The above-mentioned ink retaining layer 7 comprises a water absorptive resin. The water absorptive resin may be made of polyvinyl alcohol, for example. The water absorptive resin employed in this embodiment has high transparency and high thermal resistance. Each of the filter strips 7R, 7G, 7B of the ink retaining layer 7 is formed by coloring the water absorptive resin with a color ink, as shown in the FIG. 3.

The ink retaining layer 7 may be about 1–10 $\mu$m thick. Each of the filter strips 7R, 7G, 7B is provided when a color ink is supplied by the ink-jet method, for example. The ink retaining layer 7 is capable of retaining a suitable amount of ink when its thickness is set to the above numerical value. The filter strip 7R, 7G, 7B functions properly as a color filter when the ink retaining layer 7 contains a suitable amount of ink.

Figure 4:
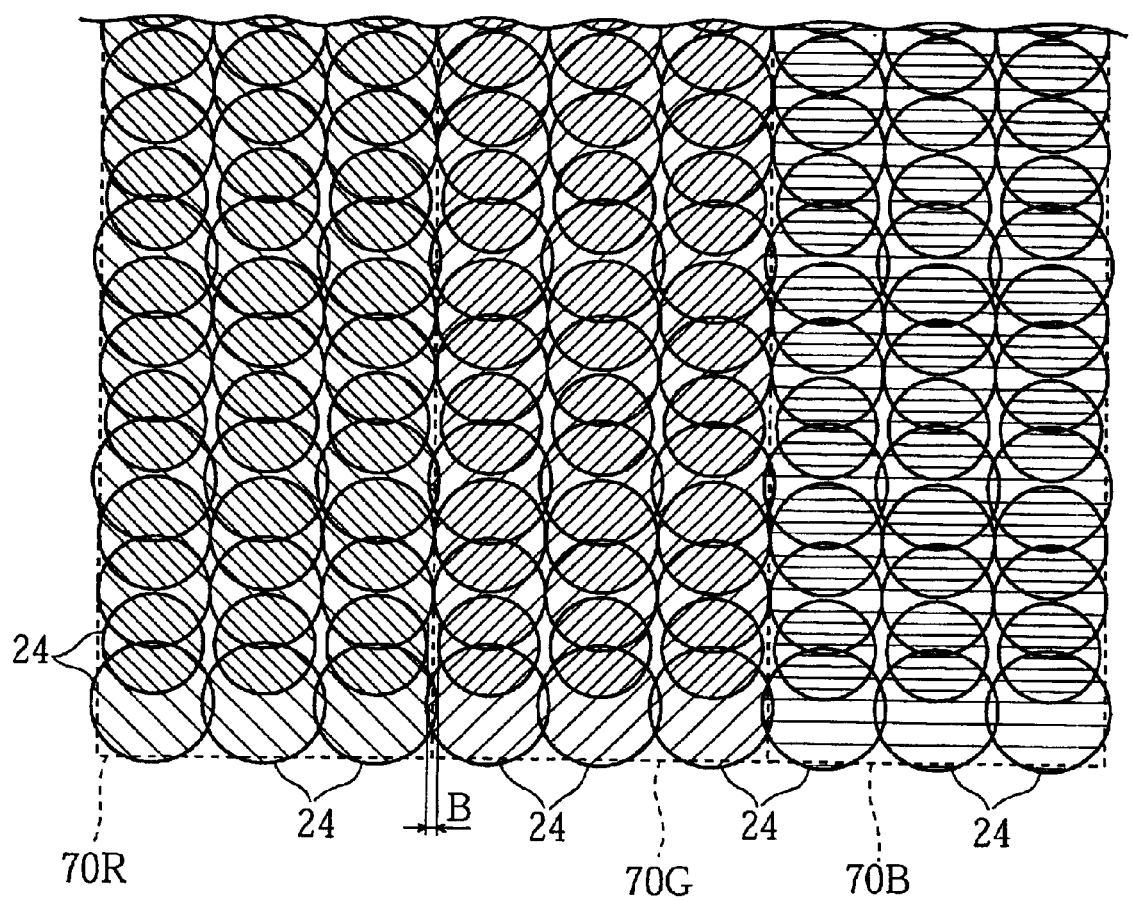
FIG. 4 is a view showing colored regions on a surface of the ink retaining layer.

Each of the filter strips 7R, 7G, 7B comprises a plurality of generally circular dots 24 formed on a surface of the ink retaining layer 7, as shown in the FIG. 4. Each of the dots 24 is formed with a color ink droplet. A plurality of such dots 24 provide colored regions 70R, 70G, 70B. Specifically, each of the colored regions 70R, 70G, 70B is a strip which comprises the dots 24 arranged in plural rows and columns.

More specifically, each of the colored regions 70R, 70G, 70B consists of three longitudinally parallel columns of dots 24. Adjacent dots 24 in each column overlap partially. Instead of strips, the colored regions 70R, 70G, 70B may comprise rectangles which are arranged alternately.

As mentioned above, each of the colored regions 70R, 70G, 70B consists of dots 24 arranged in plural rows and columns. The diameters of the dots 24 in the colored regions 70R, 70G, 70B are smaller in this arrangement than in the conventional one-column arrangement. As a result, diametrical irregularities of the dots 24 do not influence much, keeping the clearances (indicated as B in the FIG. 4) between the dots 24 at boundaries of adjacent colored regions 70R, 70G, 70B as small as possible. This also reduces the extent of undulations formed at the boundaries of the adjacent colored regions 70R, 70G, 70B.

Specifically, each strip of the colored regions 70R, 70G, 70B is approximately 90 $\mu$m in width. Each of the colored regions 70R, 70G, 70B consists of three columns of dots 24. This makes the diameter of a dot 24 approximately 30 $\mu$m. Under this condition, even if the diameters of the dots 24 vary by 10%, the clearance B at a boundary of the colored regions 70R, 70G, 70B will be only 3 $\mu$m.

The clearances in the present embodiment are approximately 1/3 in size, as opposed to those in the conventional arrangement where each dot is about 90 $\mu$m in diameter with the clearance being about 9 $\mu$m. Thus, the filter strips 7R, 7G, 7B of the liquid crystal display device provide proper color representations. The liquid crystal display device prevents image deterioration for providing a good image quality.

In the arrangement mentioned above, it is not necessary to form a black matrix which may be provided between the colored regions 70R, 70G, 70B to prevent deterioration of image quality. It is also unnecessary to provide a barrier wall or water repellent treatment at the boundaries of the colored regions 70R, 70G, 70B for preventing color ink deposition, thereby realizing a cost reduction.

In the arrangement mentioned above, some dots 24 are provided partially overlapping with dots of adjacent columns. Therefore, the colored regions 70R, 70G, 70B partially overlap each other at these circular dots 24. This arrangement reduces uncolored regions between the adjacent dots 24. This also makes it possible to provide the colored regions 70R, 70G, 70B continuously, thus contributing to improving the image quality.

Figure 5:
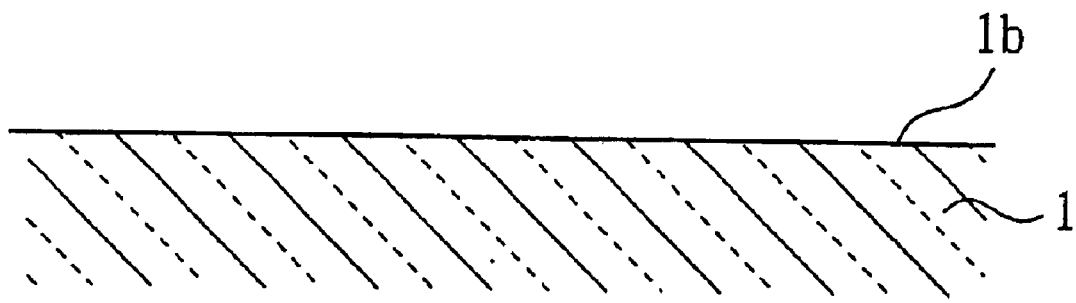
FIG. 5 is a view showing a process step for making an ink retaining layer.
Figure 6:
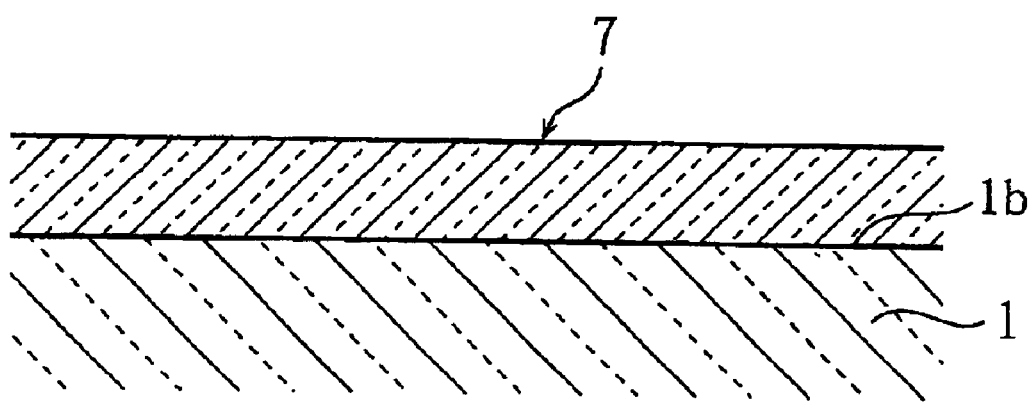
FIG. 6 is a view showing another process step for making an ink retaining layer.

The filter strips 7R, 7G, 7B of the ink retaining layer 7 may be formed in the following manner. First, a water absorptive resin containing polyvinyl alcohol is mixed with a predetermined solvent. Next, as shown in the FIGS. 5 and 6, the water absorptive resin is applied on the surface 1b of the first substrate 1 facing the second substrate 2 by spin-coating or screen printing, followed by drying. In this way, an ink retaining layer 7 is formed on the surface 1b of the first substrate 1.

Then, the ink retaining layer 7 is partially colored to provide filter strips 7R, 7G, 7B by supplying respective color inks to the ink retaining layer 7 by the ink-jet method. An ink-jet printhead 25 is employed, as shown in the FIGS. 7 and 8, for supplying the color ink. The ink-jet printhead 25 provides red, green and blue color inks, respectively.

The ink-jet printhead 25 may be of the piezoelectrically driven type, for example. Specifically, the ink-jet printhead 25 applies pressure on the ink with piezoelectric elements, and the color ink is emitted from each minute pore of nozzles 25R, 25G, 25B to be jetted into the ink retaining layer 7.

Figure 7:
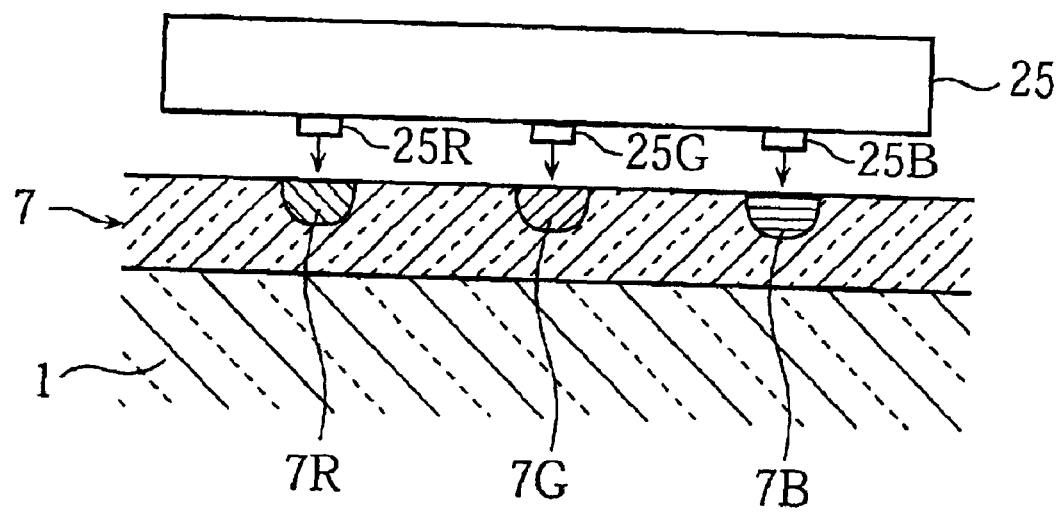
FIG. 7 is a view showing a further process step for making an ink retaining layer.

As shown in the FIG. 7, the ink-jet printhead 25 is arranged on the ink retaining layer 7 to face the positions where the filter strips 7R, 7G, 7B are to be provided. Then, the red, green and blue color inks are jetted from the respective nozzles 25R, 25G, 25B of the ink-jet printhead 25. Each of the filter strips 7R, 7G, 7B of the ink retaining layer 7 is provided with approximately 4 pl (picoliter) of the color ink. In this way, the water absorptive resin is impregnated with the color ink. A surface of the ink retaining layer 7, as shown in the FIG. 4, is provided with generally circular dots 24 with a diameter of approximately 20–40 $\mu$m.

Next, the ink-jet printhead 25 translates for subsequently jetting respective color inks to form colored dots 24 at an adjacent column. Then, the ink-jet printhead 25 translates again for forming colored dots 24 at another adjacent column by jetting respective color inks.

Figure 8:
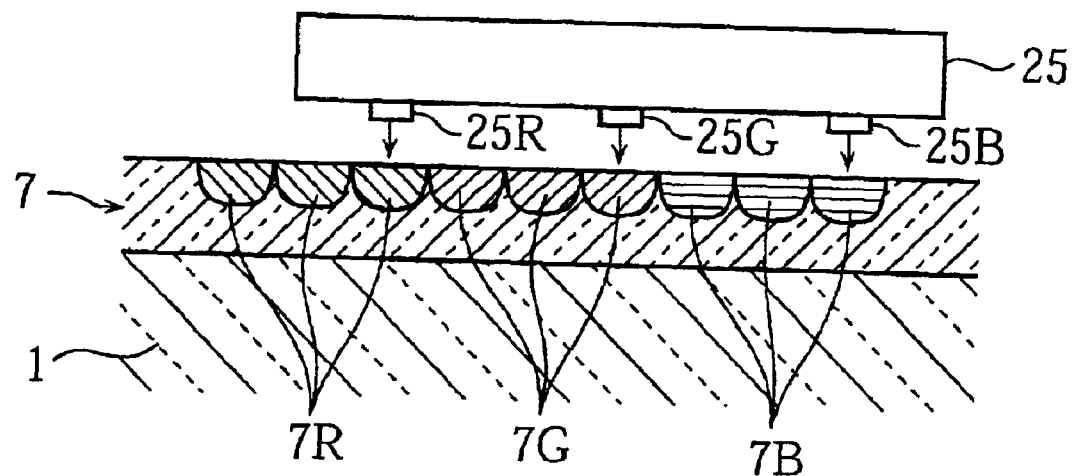
FIG. 8 is a view showing still another process step for making an ink retaining layer.
Figure 9:
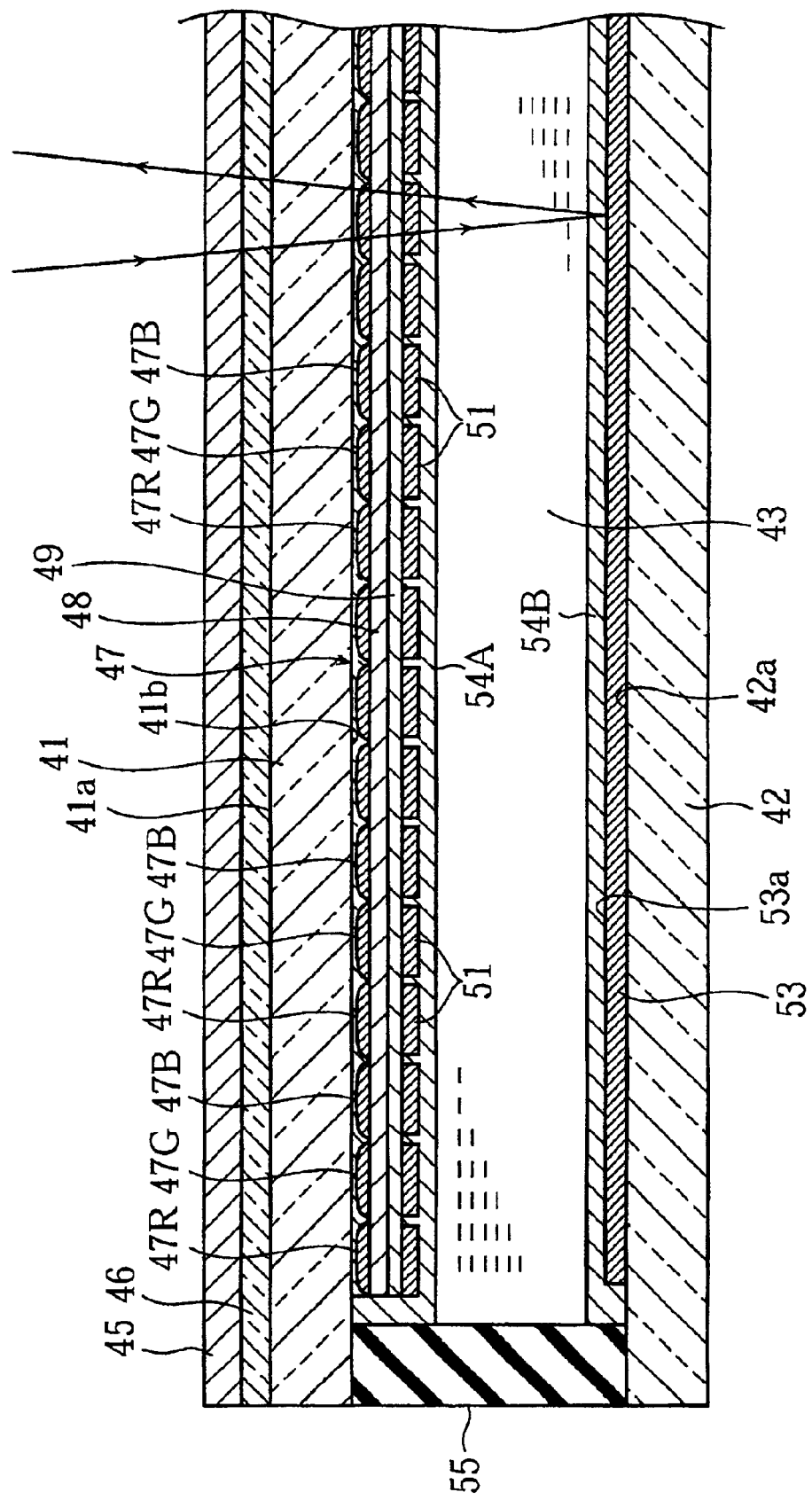
FIG. 9 is a sectional view showing a principal portion of a conventional liquid crystal display device.
Figure 10:
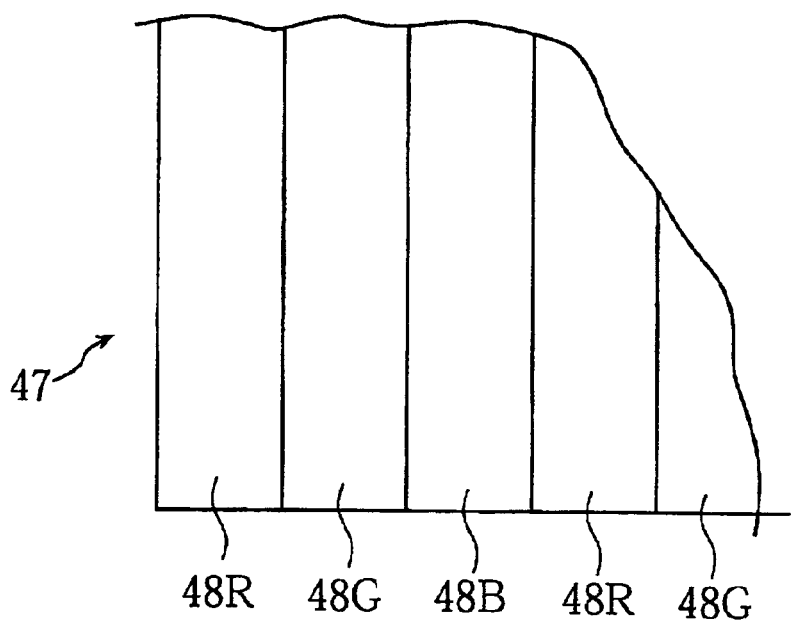
FIG. 10 is a view showing colored regions on a surface of the conventional ink retaining layer.
Figure 11:
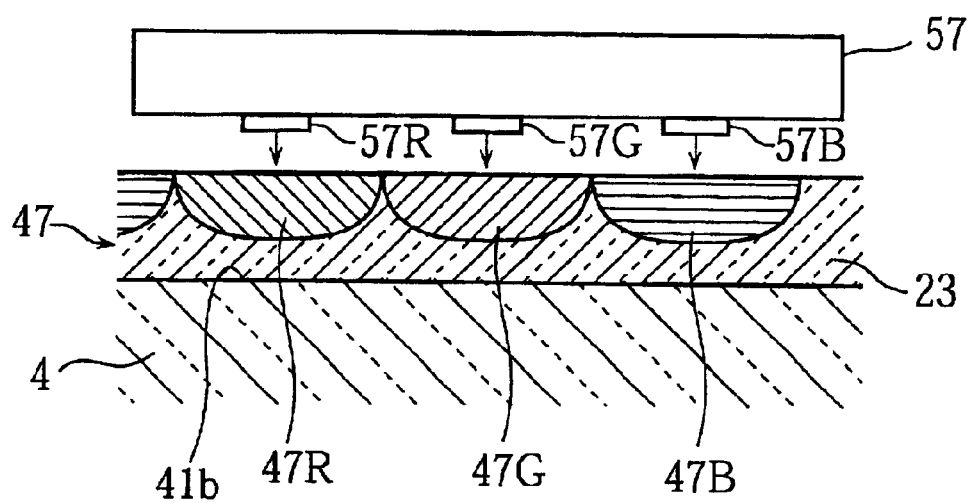
FIG. 11 is a view showing a process step for making a conventional ink retaining layer.
Figure 12:
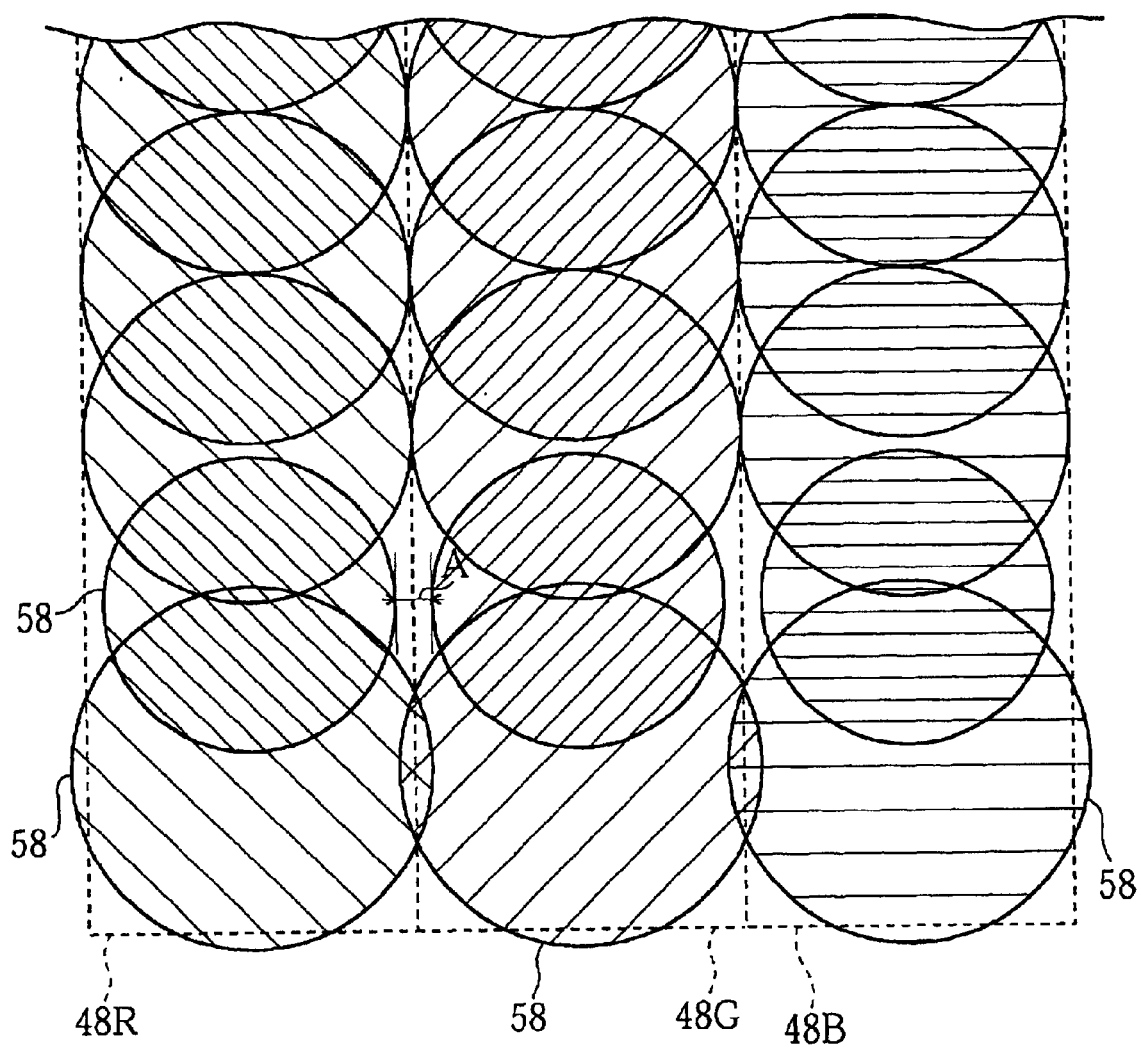
FIG. 12 is a detailed view of colored regions.

Then, the ink-jet printhead 25 moves perpendicularly to the next row for forming dots in the next row as viewed perpendicularly to the paper plain of the FIG. 8. The dots 24 formed at this time partially overlap the dots 24 formed earlier in the adjacent row. In this way, the ink retaining layer 7 is colored red, green and blue on a part-by-part basis, for providing the filter strips 7R, 7G, 7B which make up the colored regions 70R, 70G, 70B in the surface of the ink retaining layer 7. The ink-jet printhead 25 may provide a plurality of dots 24 at a time for each color.

The ink retaining layer 7 with the filter strips 7R, 7G, 7B is, then, heated at a predetermined temperature for a predetermined length of time and then cured. Thus, a color filter layer is obtained.

In this way, each of the colored regions 70R, 70G, 70B including the filter strips 7R, 7G, 7B is provided by the ink-jet method without difficulty.

The number of the columns of dots 24 in each colored region 70R, 70G, 70B is not limited to 3 as is in the above-described embodiment, but may be 2 or no less than 4. The more the columns are, the smaller the size of the clearances and the extent of undulations caused by diametrical irregularities will be, thereby a better image quality is obtained. A water absorptive resin other than the one mentioned above may be employed as long as an ink retaining layer 7 is obtained.

In the liquid crystal display device, when light reaches the polarizer plate 5, light components that vibrate only in a specific direction enter the polarizer plate 5 to be polarized. The polarized light rays travel through the retardation plate 6, and enter the first substrate 1. Then, the light rays travel through the ink retaining layer 7, the transparent electrodes 11, and the alignment film 14A to enter the liquid crystal layer 3. The light rays entering portions of the liquid crystal layer where the liquid crystal molecules are untwisted by a voltage impression do not change the vibrational direction, and impinge on the reflective electrodes 13 via the alignment film 14B. On the other hand, the light rays entering portions where a voltage is not impressed on the liquid crystal molecules change the vibrational direction before impinging on the reflective electrodes 13.

The light rays impinging on the reflective electrodes 13 are reflected on its surface 13a. The light rays reflected on the reflective electrodes 13 travel back through the same path to impinge on the polarizer plate 5. On the way back, the light rays travelling through portions of the liquid crystal layer where a voltage is impressed have not changed the vibrational direction. The light rays travelling through portions where a voltage is not impressed have changed the vibrational direction.

Among the light rays impinging on the polarizer plate 5, the light rays that have not changed the vibrational direction in the liquid crystal layer 3 go through the polarizer plate 5. The light rays that have changed the vibrational direction do not go through the polarizer plate 5. Therefore, those pixels which have not undergone voltage application will be represented in black. Those pixels which have been subjected to voltage application will be represented in red, green, blue or any suitably mixed color of these three according to the light passage area and the amount of light.

With the liquid crystal display device described above, it is possible to reduce the size of clearances and the extent of undulations on the surface of the ink retaining layer 7 at the boundaries of the adjacent colored regions 70R, 70G, 70B. Therefore, the image quality is unlikely to be deteriorated.

The liquid crystal display device in the above-described embodiment is not free from some clearances and some undulations between the dots 24 at the boundaries of the adjacent colored regions 70R, 70G, 70B even though each of the colored regions 70R, 70G, 70B is formed by arranging the dots 24 in plural columns and rows. In order to perfectly eliminate the influences of the clearances and the undulations, control of voltage impression on the liquid crystal layer 3 in the above-mentioned reflective liquid crystal display device may be performed in the normally black mode.

A reflective liquid crystal display device includes only one polarizer plate 5. Thus, a reflective liquid crystal display device is functionally similar to a transmissive liquid crystal display device that includes two polarizer plates disposed in parallel to each other and is capable of realizing the normally black mode. Therefore, the normally black mode is realizable with a reflective liquid crystal display device.

The transparent electrodes 11 are not located at positions corresponding to the boundaries of the filter strips 7R, 7G, 7B on the surface of the ink retaining layer 7.

If the normally black mode is employed, the clearances at the boundaries are normally displayed in black as long as a voltage is not impressed. Therefore, the clearances between the dots 24 at the boundaries of the adjacent colored regions 70R, 70G, 70B will not deteriorate the image quality at all.

The scope of the present invention is, of course, not limited to the above-described embodiment. For example, the piezoelectrically driven ink-jet printhead described above may be replaced with a bubble ink-jet printhead.

Although the above-described ink-jet printhead jets red, green and blue color inks to the ink retaining layer 7, yellow, magenta and cyan inks as used in a multi-purpose ink-jet printhead may be suitably mixed to produce red, green and blue colors.

The structure of the ink retaining layer 7 employed in the reflective liquid crystal display device according to the above-descried embodiment may also be adopted in a transmissive liquid crystal display device. In utilizing the transmissive liquid crystal display device, two polarizer plates may be provided with their polarization axis in parallel to each other, and control of voltage impression on the liquid crystal layer is performed in the normally black mode.

What is claimed is:

1. A liquid crystal display device comprising: a first and a second substrates disposed in parallel to each other; a liquid crystal layer disposed between the two substrates and filled with liquid crystal; and a color filter layer disposed on a surface of the first substrate facing the second substrate;

wherein a surface of the color filter layer is provided with plural filter strips each retaining a respective color ink; and wherein each of the filter strips includes plural columns and plural rows of generally circular dots of the same color, each of the dots being provided by a color ink droplet, and at least one column of dots in each filter strip partially overlaps with an adjacent column of dots of the same color and an adjacent column of dots of a different color.

2. The liquid crystal display device according to claim 1, wherein the color filter layer comprises a water absorptive resin.

3. The liquid crystal display device according to claim 2, wherein each of the filter strips is provided by impregnating the water absorptive resin with a respective color ink.

4. The liquid crystal display device according to claim 1, wherein each of the dots is 20–40 μm in diameter.

5. The liquid crystal display device according to claim 1, wherein adjacent ones of the dots partially overlap each other.

6. The liquid crystal display device according to claim 1, wherein the color inks include red, green and blue inks.

7. The liquid crystal display device according to claim 1, wherein the liquid crystal in the liquid crystal layer is controlled by voltage application in a normally black mode.

8. A process for making a liquid crystal display device which comprises: a first and a second substrates disposed in parallel to each other; a liquid crystal layer disposed between the two substrates and filled with liquid crystal; and a color filter layer disposed on a surface of the first substrate facing the second substrate; the process comprising the steps of:

applying a water absorptive resin onto the surface of the first substrate facing the second substrate to form an ink retaining layer that serves as the color filter layer; and jetting different color inks onto the ink retaining layer to form filter strips at each of which the water absorption resin is impregnated with a respective color ink;

wherein the step of forming the filter strips is performed in a manner such that each of the filter strips includes plural columns and plural rows of generally circular dots of the same color, each of the dots being provided by a color ink droplet, and at least one column of dots in each filter strip partially overlaps with an adjacent column of dots of the same color and an adjacent column of dots of a different color.

9. The process for making the liquid crystal display device according to claim 8, wherein the step of forming the filter strips includes jetting different color inks onto the ink retaining layer by an ink-jet method.

10. The process for making the liquid crystal display device according to claim 8, wherein the water absorptive resin comprises polyvinyl alcohol.

* * * * *